United States Patent
Ignacio

(10) Patent No.: US 7,475,896 B2
(45) Date of Patent: Jan. 13, 2009

(54) ABSORBABLE RISER FOR RECREATIONAL VEHICLES

(76) Inventor: Jeffery W. Ignacio, 41 Llewellyn St., Lowell, MA (US) 01850

(*) Notice: Subject to any disclaimer, the term of this patent is extended or adjusted under 35 U.S.C. 154(b) by 799 days.

(21) Appl. No.: 10/937,090

(22) Filed: Sep. 9, 2004

(65) Prior Publication Data

US 2006/0049610 A1    Mar. 9, 2006

(51) Int. Cl.
*B62K 21/20* (2006.01)
(52) U.S. Cl. .................. 280/276; 74/551.2; 180/190
(58) Field of Classification Search ................. 280/276, 280/283, 275; 74/551.1, 551.2, 551.3; 180/190
See application file for complete search history.

(56) References Cited

U.S. PATENT DOCUMENTS

| | | | | | |
|---|---|---|---|---|---|
| 4,420,989 | A | * | 12/1983 | Finkle | 74/551.2 |
| 5,220,851 | A | * | 6/1993 | Flechel | 74/551.2 |
| 5,241,881 | A | * | 9/1993 | Chen | 74/551.2 |
| 5,253,544 | A | * | 10/1993 | Allsop et al. | 74/551.1 |
| 2004/0090031 | A1 | | 5/2004 | Bergman | |

* cited by examiner

*Primary Examiner*—Tony H. Winner
(74) *Attorney, Agent, or Firm*—Hamilton, Brook, Smith & Reynolds, PC

(57) ABSTRACT

A shock absorbable handlebar riser assembly is provided for use with a recreational vehicle, such as a snowmobile or ATV. The shock absorbable handlebar riser assembly includes a pair of riser arms and a shock absorbable member. The riser arms are rotatably coupled between a steering shaft and handlebars. The shock absorbable member is fixedly coupled between the steering shaft and the handlebars.

15 Claims, 6 Drawing Sheets

ABSORBABLE RISER FOR RECREATIONAL VEHICLES

BACKGROUND

Snowmobiles are a widely used means of transportation in snowy regions. They are especially popular for recreational purposes such as trail riding or racing.

The typical snowmobile is propelled by a rear mounted endless rubber track powered by a gasoline engine and is steered by two forward mounted skis. A driver controls direction of the snowmobile using a set of handlebars mounted at the upper end of a steering post. The steering post is connected to the skis' steering system through an arm at its lower end which is a torque inducing component, such that as the torque is transmitted along the steering post from the handlebars. The torque is then transferred through the arm to the steering linkages of the steering system to turn the skis in synchronized fashion with respect to the drive track. A handlebar riser is typically mounted between the handlebars and the steering post to provide the driver with a more comfortable riding position.

Snowmobiles are operated on a variety of terrains, including ice, snow, snow and icy rutted trails, and jumps. As such, the driver's body may be jolted in a back and forth fashion causing the driver to receive a majority of the forces through the handlebars when riding on such terrain. These forces can result in short term fatigue of the driver's upper torso and wearing of the driver's joints.

SUMMARY

There is a need to reduce the amount of forces acting upon a snowmobile or recreational vehicle driver's body when riding. The present invention provides a shock absorbable handlebar riser system for a recreational vehicle having a handlebar support tube, a handlebar, a pair of diametrically opposing riser members coupled between the handlebar support tube and the handlebar, and a shock absorbable member coupled between the handlebar and the handlebar support tube. The shock absorbable member can be a gas shock, a pneumatic shock, or a spring. The shock absorbable member can be adjustable in length, compression pressure and other aspects. The handlebar support tube can be part of a steering post for the recreational vehicle. The recreational vehicle can be a snowmobile or an all-terrain vehicle or the like.

Each riser member includes a distal end and a proximal end, the distal ends being fixedly coupled to the handlebar and the proximal ends being rotatably coupled to the handlebar support tube. The proximal ends of each riser member include protrusions for rotatably coupling to the handlebar support tube. The protrusion can be solid or hollow in form.

DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A description of preferred embodiments of the invention follows.

Figure 1:
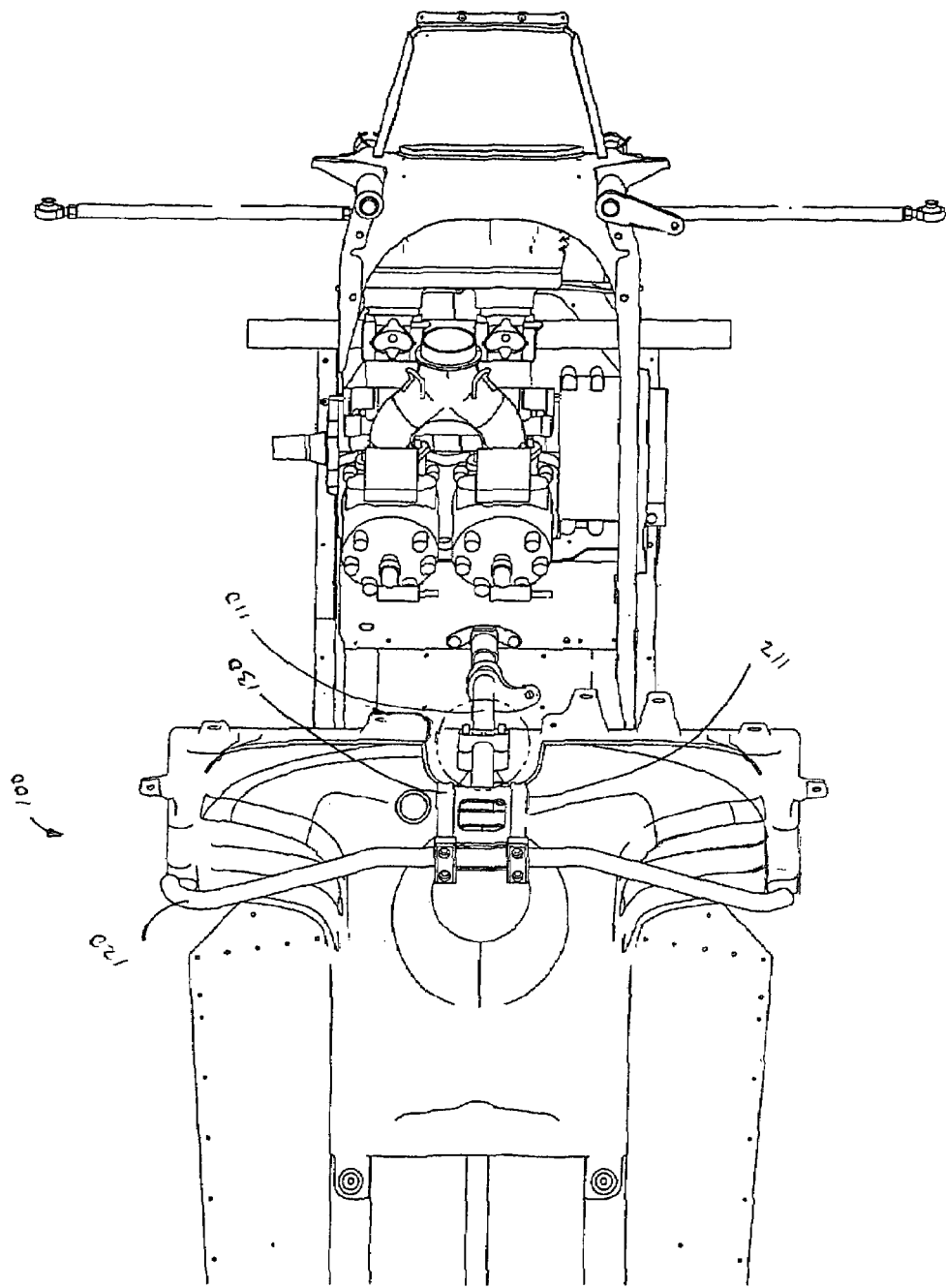
FIG. 1 is a perspective view of a steering system according to the prior art.

FIG. 1 is a perspective view of a steering system according to the prior art. The steering system is particularly suited for use with a snowmobile 100, but could be adapted for use with other recreational vehicles, such as an all terrain vehicle (ATV). The snowmobile 100 includes a steering shaft 110, a handlebar support tube 112, a pair of handlebars 120, and a handlebar riser 130.

The steering shaft 110 may be a hollow tube having a first end and a second end. Typically, the steering shaft 110 is machined metal. Located near the first end of the steering shaft 110 is the handlebar support tube 112. The handlebar support tube 112 may be supported by a gusset (not shown). The handlebar support tube 112 may be hollow.

The handlebar riser 130 is fixedly mounted to the handlebar support tube 112 and the handlebars 120. A rider manipulates the handlebars 120 in order to maneuver the vehicle. Torque is transmitted from the handlebars 120 along the steering shaft 110 and then, transferred to a steering system through a steering arm to turn a pair of skis in a synchronized fashion with respect to a drive track.

Figure 2A:
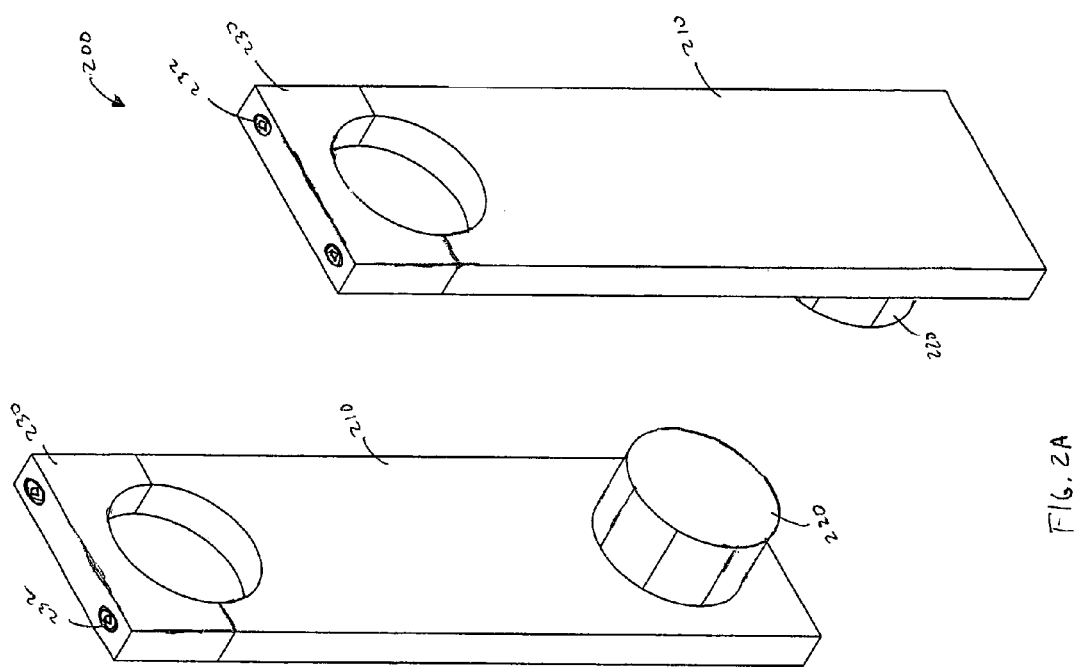
FIG. 2A is a perspective view of a pair of riser arms of an embodiment of the present invention.
Figure 2B:
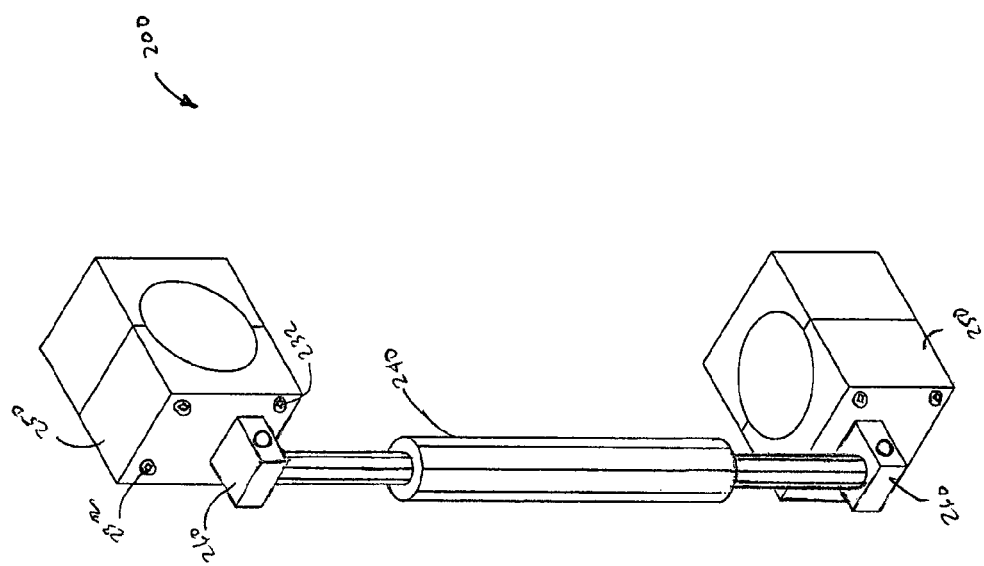
FIG. 2B is a perspective view of a shock absorbing member of an embodiment of the present invention.

FIGS. 2A and 2B show a perspective view of a riser assembly 200 according to one embodiment of the present invention. The riser assembly includes a pair of riser arms 210 and a shock absorbable member 240. The riser arms 210 include rotation posts 220 for rotatably mounting to the handlebar support tube 112 of FIG. 1. The rotation posts 220 may be solid or hollow. The riser arms 210 also include connection brackets 230 and connection bolts 232 for fixedly mounting the riser assembly 200 to the handlebars 120 of FIG. 1. The shock absorbable member 240 includes connection clamps 250, connection bolts 232, and rotation members 260. The rotation members 260 pivot allowing the shock absorbable member 240 to compress or expand during use. The shock absorbable member 240 can be a gas or pneumatic shock, or a spring either of which may be adjustable depending on the size of the vehicle and/or the weight of the driver. For example, in one embodiment shock absorbing member 240 is a gas pressured shock absorber set at about 200 psi in a normally elongated position. During riding, a jolting force of about 200 lbs or higher from the driver or the vehicle will cause the shock absorbing member 240 to compress to absorb the jolt and hence save (or minimize impact to) the driver from such acting forces. Other settings for the shock absorbing member 240 are suitable.

Figure 3A:
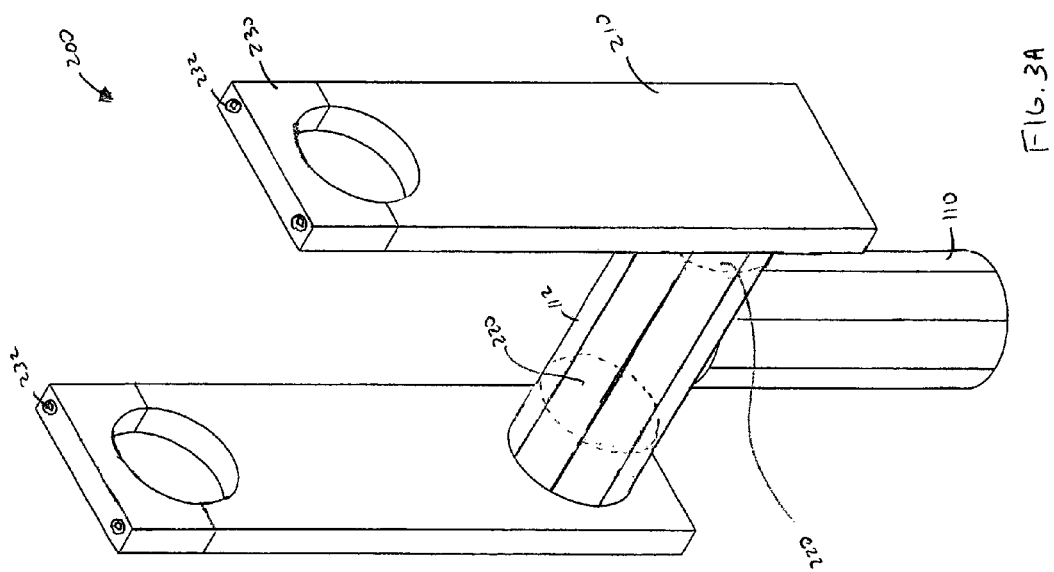
FIG. 3A is a perspective view of the riser arms of FIG. 2A rotatably coupled to a steering post of a recreational vehicle.

FIG. 3A shows a perspective view of the riser arms 210 of FIG. 2A rotatably coupled to the handlebar support tube 112 of FIG. 1 of the steering shaft 110 of a recreational vehicle. As shown, the rotation posts 220 are inserted and with rotational freedom seated in the hollow openings of the handlebar support tube 112. In another embodiment, the rotation posts 220 can be hollow to rotatable fit around a solid handlebar support tube (not shown).

Figure 3B:
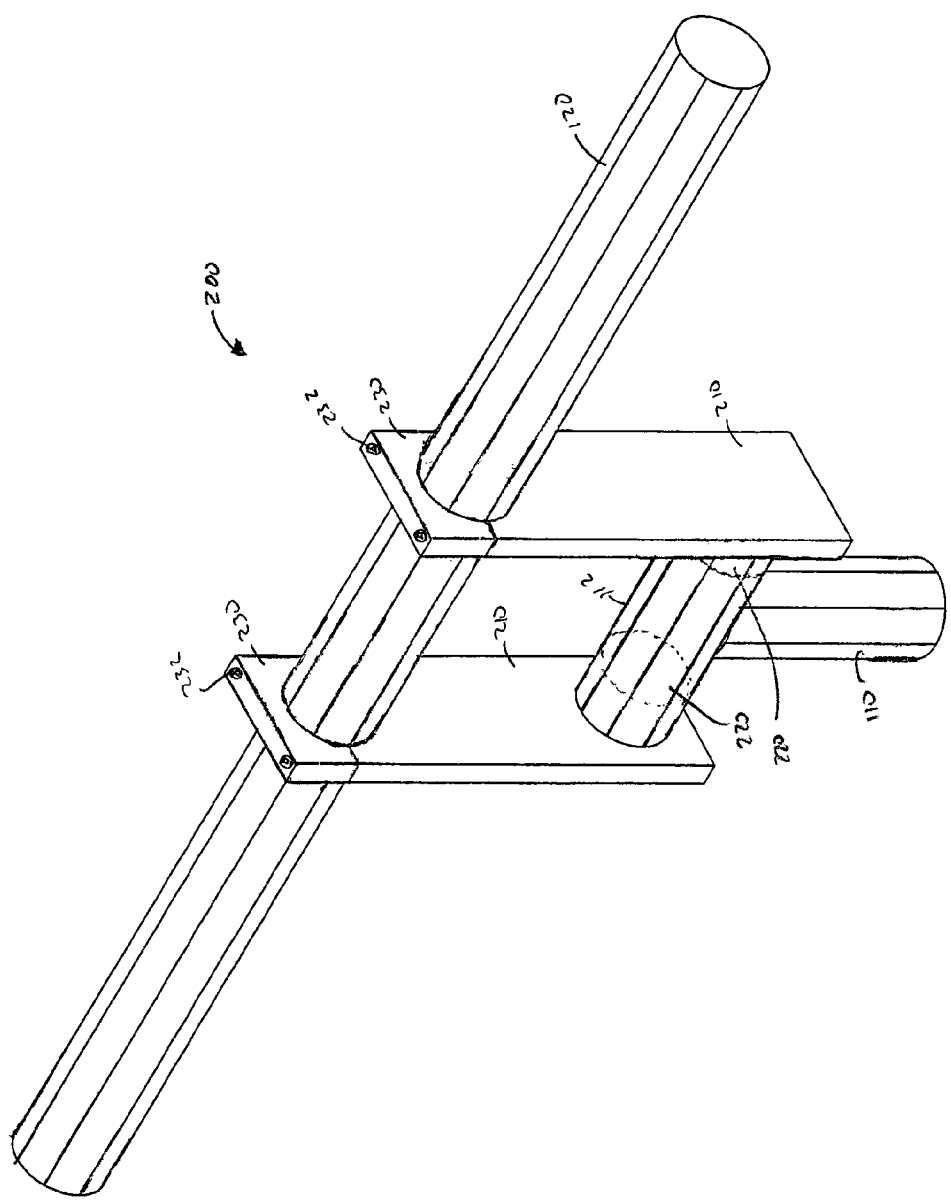
FIG. 3B is a perspective view of the embodiment of FIG. 3A including handlebars.

FIG. 3B shows a perspective view of the handlebar riser assembly 200 of FIG. 3A including the handlebars 120 of FIG. 1 (The handlebars 120 are shown in a partial view for simplicity). The handlebars 120 are fixedly secured to the riser arms 210 using connection brackets 230 and connection bolts 232. The connection of the handlebars 120 allows the handlebar riser assembly 200 to rotate about the handlebar support tube 112 without disengaging.

Figure 3C:
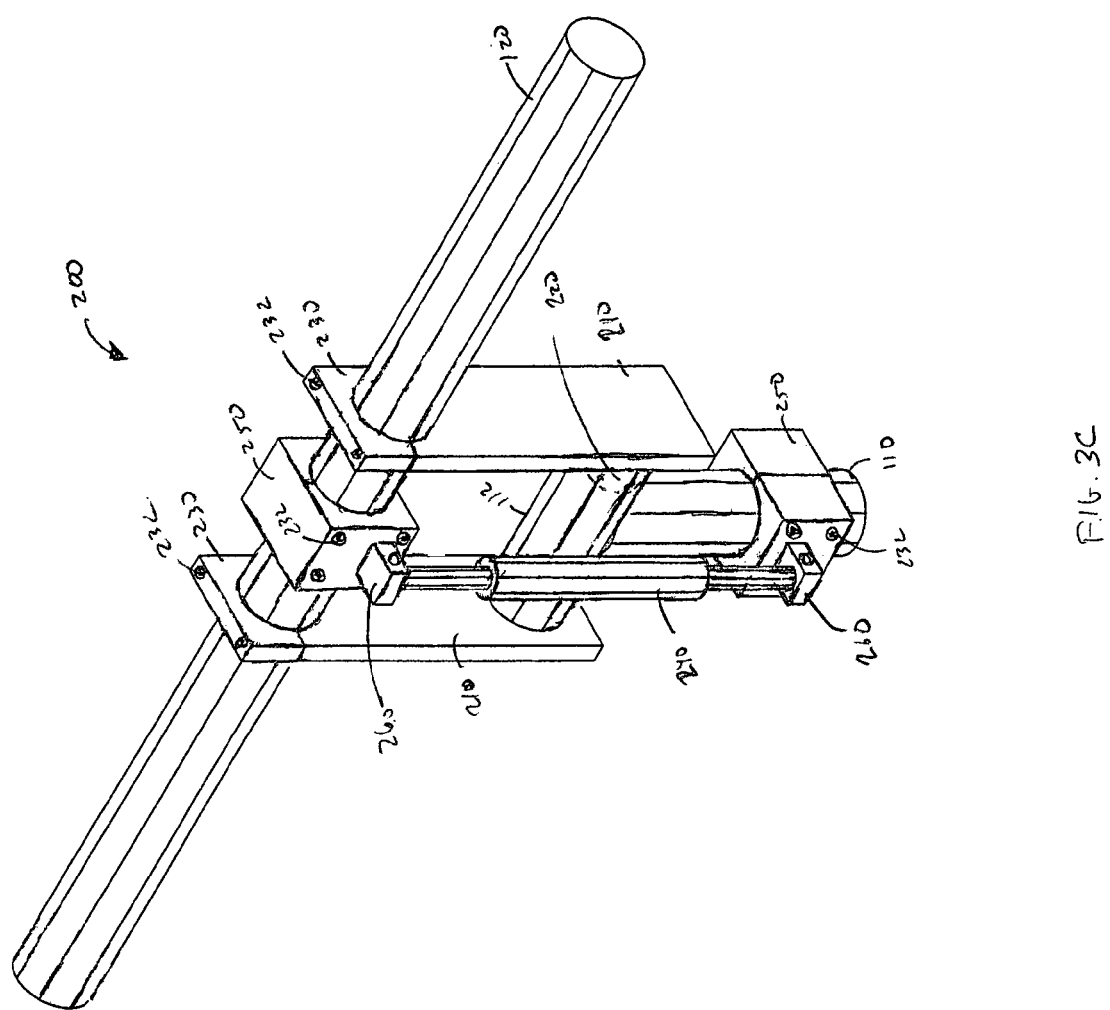
FIG. 3C is a perspective view of the embodiment of FIG. 3B including a shock absorbing member.

FIG. 3C shows a perspective view of the completed handlebar riser assembly 200 including a shock absorbing member 240. The shock absorbing member 240 is fixedly secured to the handlebars 120 and the steering shaft 110 using connection clamps 250 and connection bolts 232. The shock absorbing member 240 prevents the handlebar riser assembly 200 from rotating to far in the forward and backward directions. It should be understood by one skilled in the art that the shock absorbing member 240 could be fixedly attached to handlebars 120 and the steering shaft 110 in any configuration or with any means known. Such as connecting the shock absorbing member 240 directly to the handlebars 120 and/or the steering post or handlebar support tube 112 using through bolts (not shown).

In operation, as a driver is jolted back and forth toward the front and rear of the vehicle, the shock absorbing member 240 absorbs the forces that would otherwise be spread throughout the driver's upper torso. This absorption provides the driver with a more comfortable ride while preventing the wearing of the driver's joints. The shock absorbing member 240 may be normally in an elongated position and then compressed during absorption moments (jolting action) or vice versa.

While this invention has been particularly shown and described with references to preferred embodiments thereof, it will be understood by those skilled in the art that various changes in form and details may be made therein without departing from the scope of the invention encompassed by the appended claims.

What is claimed is:

1. A shock absorbable handlebar riser system for a recreational vehicle, comprising:
    a handlebar support tube;
    a handlebar;
    a pair of diametrically opposing riser members coupled between the handlebar support tube and the handlebar, the riser members spacing apart the handlebar and the handlebar support tube;
    a shock absorbable member coupled between the handlebar and the handlebar support tube; and
    a rotation member coupling the shock absorbable member to the handlebar, the rotation member pivoting to compress or expand the shock absorbable member during use of the recreational vehicle.

2. The system of claim 1, wherein each riser member includes a distal end and a proximal end, the distal ends being fixedly coupled to the handlebar and the proximal ends being rotatably coupled to the handlebar support tube.

3. The system of claim 2, wherein each riser member includes a protrusion at its proximal end for rotatably coupling to the handlebar support tube.

4. The system of claim 3, wherein the protrusion is solid or hollow in form.

5. The system of claim 1, wherein the shock absorbable member is a gas shock, a pneumatic shock, or a spring.

6. The system of claim 5, wherein the shock absorbable member is adjustable.

7. The system of claim 1, wherein the handlebar support tube is part of a steering post for the recreational vehicle.

8. The system of claim 1, wherein the recreational vehicle is a snowmobile or an all-terrain vehicle.

9. A method of absorbing forces on a handlebar of a recreational vehicle, comprising:
    extending a distance between the handlebar and a handlebar support tube by coupling a pair of diametrically opposing riser members between the handlebar and the handlebar support tube, each riser member including a distal end and a proximal end, the distal end being fixedly coupled to the handlebar and the proximal end being rotatably coupled to the handlebar support tube; and
    absorbing forces delivered to a rider through the handlebar by pivotally coupling a shock absorbable member between the handlebar and the handlebar support tube such that the shock absorbable member compresses or expands while the rider rides the recreational vehicle.

10. The method of claim 9, wherein each riser member includes a protrusion at its proximal end for rotatably coupling to the handlebar support tube.

11. The method of claim 10, wherein the protrusion is solid or hollow in form.

12. The method of claim 9, wherein the shock absorbable member is a gas shock, a pneumatic shock, or a spring.

13. The method of claim 12, wherein the shock absorbable member is adjustable.

14. The method of claim 9, wherein the handlebar support tube is part of a steering post for the recreational vehicle.

15. The method of claim 9, wherein the recreational vehicle is a snowmobile or an all-terrain vehicle.

\* \* \* \* \*